Nov. 21, 1961 W. A. SEEM ET AL 3,009,312
METHODS OF PRODUCING TORQUE YARNS
Filed July 30, 1956 10 Sheets-Sheet 1

INVENTORS:
NICHOLAS J. STODDARD
WARREN A. SEEM
BY Howson & Howson
ATTYS.

Nov. 21, 1961 W. A. SEEM ET AL 3,009,312
METHODS OF PRODUCING TORQUE YARNS
Filed July 30, 1956 10 Sheets-Sheet 4

INVENTORS:
NICHOLAS J. STODDARD
WARREN A. SEEM
BY Howson & Howson
ATTYS.

Nov. 21, 1961  W. A. SEEM ET AL  3,009,312
METHODS OF PRODUCING TORQUE YARNS
Filed July 30, 1956  10 Sheets-Sheet 5

FIG. 7.

INVENTORS:
NICHOLAS J. STODDARD
WARREN A. SEEM
BY *Howson & Howson*
ATTYS.

Nov. 21, 1961 W. A. SEEM ET AL 3,009,312

METHODS OF PRODUCING TORQUE YARNS

Filed July 30, 1956 10 Sheets-Sheet 6

INVENTORS:
NICHOLAS J. STODDARD
WARREN A. SEEM

BY Howson & Howson

ATTYS.

Nov. 21, 1961 W. A. SEEM ET AL 3,009,312
METHODS OF PRODUCING TORQUE YARNS
Filed July 30, 1956 10 Sheets-Sheet 7

INVENTORS:
NICHOLAS J. STODDARD
WARREN A. SEEM
BY Howson & Howson
ATTYS.

United States Patent Office 3,009,312
Patented Nov. 21, 1961

3,009,312
METHODS OF PRODUCING TORQUE YARNS
Warren A. Seem, Chester Springs, and Nicholas J. Stoddard, Philadelphia, Pa., assignors to Textile Licensing Company, North Wales, Pa., a partnership
Filed July 30, 1956, Ser. No. 600,837
16 Claims. (Cl. 57—157)

The present invention relates to methods, particularly those involving the use of false twist spindles, of producing monofilament, multi-filament and spun staple fibre yarns having, in different predetermined sections of their continuous length, torsional forces in varying degrees or directions. The present application is a continuation-in-part application of the copending application, Serial Number 503,364, filed April 25, 1955 by Seem and Stoddard, now U. S. Patent No. 2,966,775.

The present invention pertains to methods of producing yarns such as disclosed in our U. S. patent application Serial Number 503,364, or more specifically, yarns having in different predetermined sections of their continuous length, functional torque in varying degrees or directions as a result of being twisted, yarn set while twisted, and then reverse twisted exactly the same extent as twisted. The twisting and reverse twisting is characteristic of all false twisting operations. It is to be understood that in the specification and claims, the term "torque" is intended to mean a force which produces or tends to produce rotation or torsion of the yarn about its axis, irrespective of the degree of actual twist, if any, in the yarn. It is also to be understood that in the specification and claims, the term "false twist spindle" is intended to mean a hollow twisting-and-untwisting spindle which inserts and removes the identical amount of twist. The terms "false twist" and "false twisting" are intended to mean the twisting and untwisting on a hollow twisting-and-untwisting spindle, or similar apparatus.

The invention contemplates methods of producing yarns having in various predetermined sections of their continuous length, Z torque of a given magnitude, Z torque of a different magnitude, no torque, S torque of said given magnitude, and S torque of a different magnitude, as well as yarns having in their continuous length any combination of two or more of these torque characteristics in selected sectional lengths of the yarns.

All of the objects and the various features and details of the operation of the methods are more fully set forth hereinafter with reference to the accompanying drawings, in which.

Figure 1:
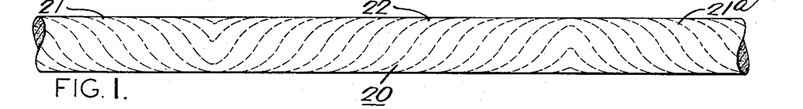
FIG. 1 shows a continuous length yarn having in alternate sections of its length, torque in opposite directions.

FIG. 1 represents a continuous length twisted and untwisted yarn 20 having in one section of its length 21, Z torque, in another section of its length 22, S torque, and in another section of its length 21a, Z torque identical to the torque in section 21. Thus, the torque alternates between S and Z directions throughout its length. The sections of S torque may be equal in length to the sections of Z torque, or the alternating sections may vary in length.

Figure 2:
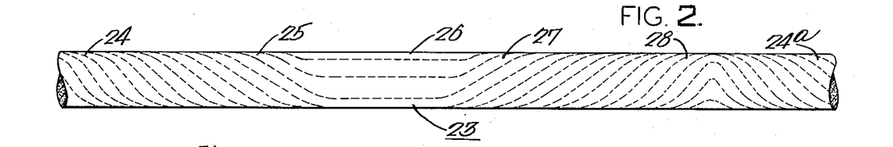
FIG. 2 shows a continuous length yarn having in selected sections of its length, no torque and torque in varying degrees and directions.

FIG. 2 represents a continuous length twisted and untwisted yarn 23 having in one section of its length 24 a high degree of Z torque, in a second section of its length 25 a medium degree of Z torque, in a third section of its length 26 no torque, in a fourth section of its length 27 a medium degree of S torque, in a fifth section of its length 28 a high degree of S torque and in a sixth section of its length 24a torque the same as in section 24. The section 24a may represent the start of a repetition of the aforesaid pattern. By using the false twist methods of the present invention innumerable different patterns embodying different sectional lengths of yarn may be created having torques differing in degree and/or direction.

In the patent applications of Stoddard and Seem, Serial Numbers 401,803, 401,951, and 401,952, filed January 4, 1954 (now U. S. Patent Numbers 2,803,108, 2,803,109, and 2,803,105), Serial Number 489,693, filed February 21, 1955 and Serial Number 535,968, filed September 27, 1955, now U. S. Patent No. 2,891,376, we have disclosed methods and means of utilizing false twist spindles and conventional spindles to insert unidirectional torsional forces into yarns so as to produce crimped, wavy or fluffed yarns; yarns having functional torque without bulk; or yarns having functional torque irrespective of bulking properties. The apparatus disclosed in the aforementioned patent applications together with the modifications and additions described hereinafter may also be used in the present invention.

In all of the methods embodying the present invention as defined in the appended claims, it is to be understood that the false twisting may be carried out on (a) heated yarns which are inherently thermoplastic, heated non-thermoplastic yarns which have been given characteristics of thermoplastic yarns as a result of impregnation or coating with thermoplastic or thermal setting material, or heated non-thermoplastic yarns which have been moistened or wet-out or (b) yarns at ambient temperature which are capable of being cold drawn. By "yarn-set," we mean that the yarn or the filament thereof is uniformly and permanently shaped in accordance with the geometric shape at the time of yarn-setting so that the yarn or the individual filament thereof at all times has an inherent tendency to assume this formation. In some embodiments of the invention involving multifilament or spun staple fibre yarns, the torque herein referred to in the specification and claims may be of such a degree as to cause a separation of the individual strands or filaments or so called bulking of the yarn and in other embodiments, torque without bulking is contemplated.

Figure 3:
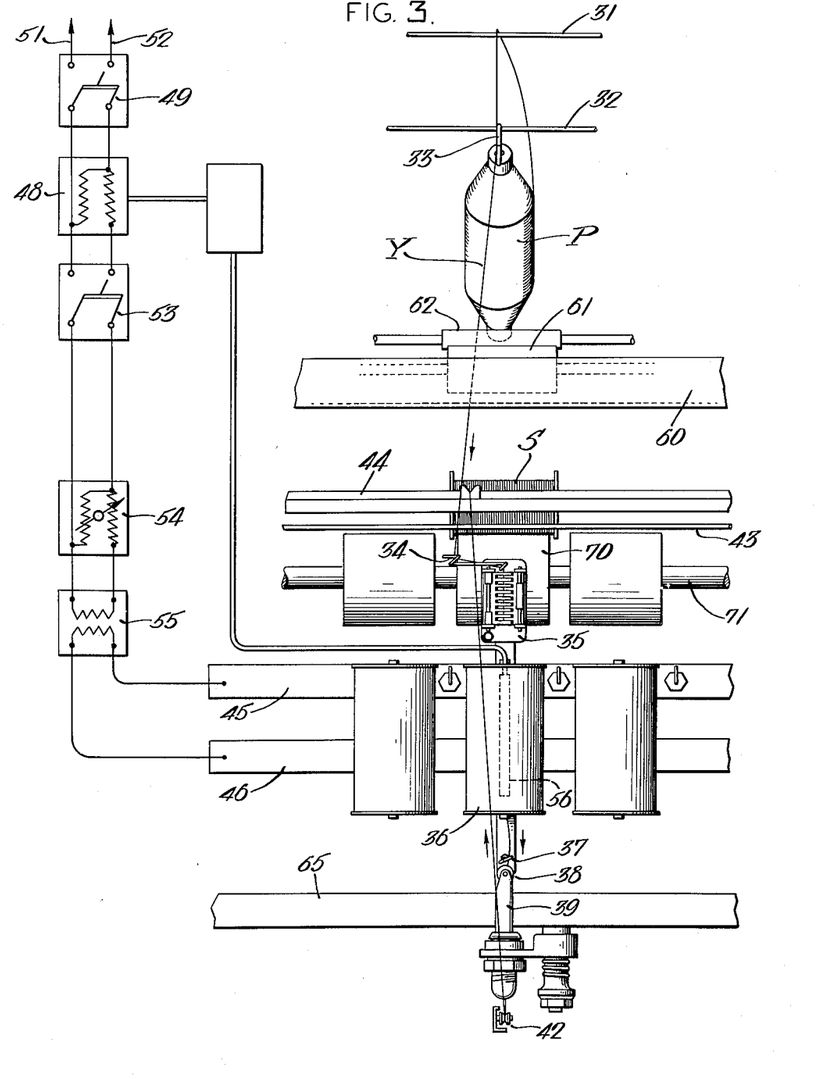
FIG. 3 is a fragmentary front elevational view of an up-twister embodying apparatus for performing the methods of the present invention, with the electrical controls therefor shown schematically.
Figure 4:
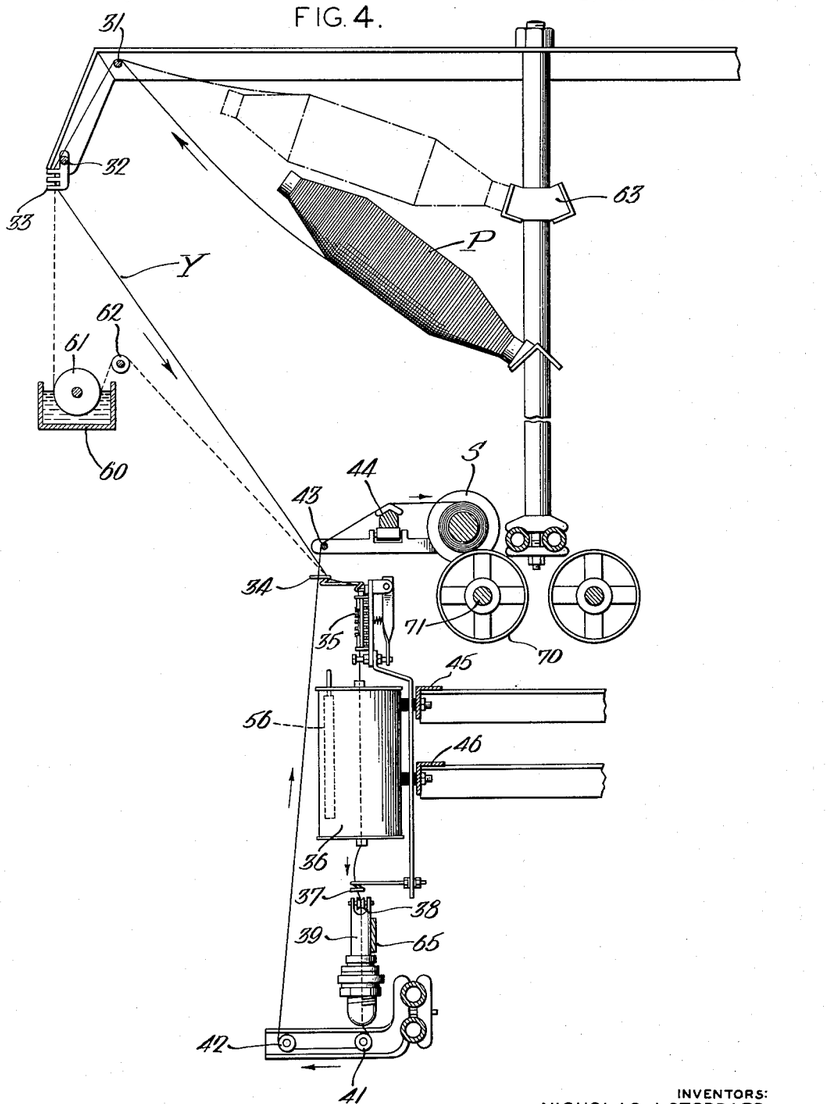
FIG. 4 is a transverse fragmentary sectional view of the apparatus shown in FIG. 3.
Figure 5:
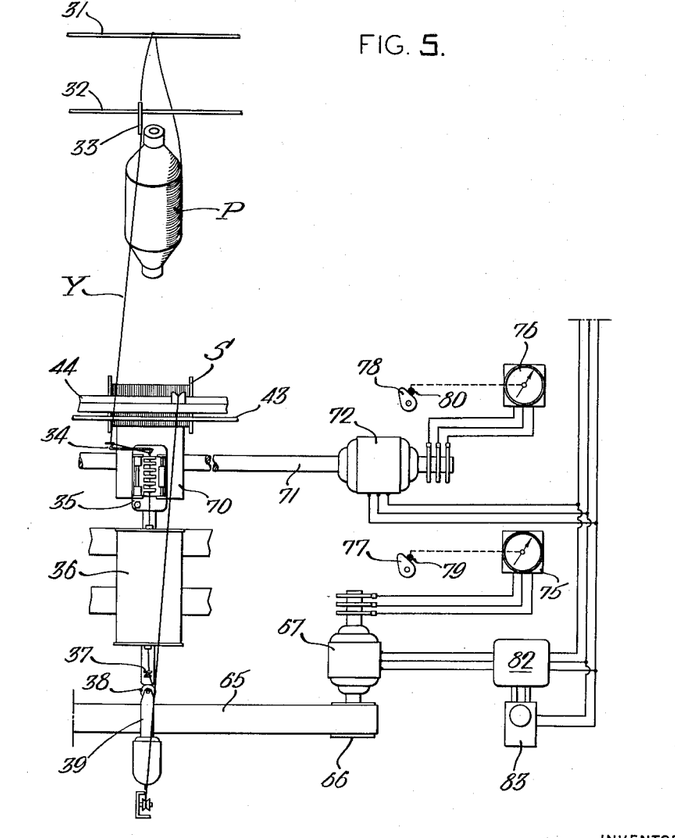
FIG. 5 is a view similar to FIG. 3 at a reduced scale showing schematically the drive for the operating elements of the apparatus.

FIGS. 3 to 5 are fragmentary views respectively in front elevation and in cross-section of a sectional length of a false twist apparatus for inserting torque forces into yarns.

In the operation of the arrangement shown in FIGS. 3 to 5 of the drawings, the yarn Y is drawn over-end from a supply package P, over guide bars 31 and 32, through a snubber tension 33, through a pig-tail guide 34, through a tensioning device 35, through a heating device 36, through a balloon control guide 37, once or more about a wheel 38 of a hollow spindle 39, through the spindle 39, partially around guide rolls 41 and 42, over a guide bar 43, over a traverse guide 44 and onto a take-up spool S. The yarn is twisted between tensioning device 35 and wheel 38 and the twisted yarn is subjected to heat while traveling through heating device 36. Immediately upon leaving wheel 38, all of the twist inserted is removed.

The heating device 36 is electrically heated, current being conducted to it through two fixed horizontal bus bars 45 and 46 to which the device 36 is secured, with interposition of insulating bushings. The required degree of heat is uniformly maintained by current at a constant voltage (not exceeding twenty-four volts for personal safety) through an automatic induction voltage regulator 48, and a switch 49 from a power line 51 and 52. The regulator 48 is connected by conductors through a switch 53 to a manually adjustable induction voltage regulator 54 which is connected in turn to the primary of a step-down transformer 55 is a circuit with the bus bars 45, 46. The output of the induction voltage regulator 48 is automatically governed by a thermally-responsive sensing means 56 incorporated in the heating device 36. The automatic and the manual induction voltage regulators 48 and 54 and the thermostatic sensing means 56 may all be of any approved standard and commercially available types by cooperation of which the temperature in the heating device is modulated compensatively with changes in ambient temperature and transfer of heat to the yarn traveling therethrough. The switches 49 and 53 are manually operable safety hand switches of any commercially available type.

As disclosed in the above-mentioned patent applications, the tension in the tension device 35 is accurately regulated usually to stretch the yarn to an extent to remove substantially all ductility. In doing this, a permanent set is imparted to the yarn while it is twisted in the zone between the tension device 35 and the roller 38.

When treating non-thermoplastic yarns, it is necessary to impregnate or coat the yarn with thermoplastic or thermal setting material or otherwise moisten or wet out the yarn. To this end, a trough for the treating liquid is provided as indicated at 60 in FIGS. 3 and 4. A roller 61 is mounted in the trough and a guide is provided at 62 to direct the yarn in the path indicated by the broken lines in FIG. 4. When treating yarns which are capable of being cold drawn, the heating device may be disconnected, and the tension is regulated to remove the ductility of the yarn. In addition, if it is desired to treat two yarns simultaneously, a second yarn supply may be mounted on the apparatus as indicated at 63. The yarn from the second supply may be threaded through the apparatus with the yarn Y and the two yarns will form a double strand which is treated as described above.

In the processing of the yarn on the apparatus shown in FIGS. 3 to 5, the yarn Y is drawn from the supply P through the tension device 35 and the heater 36 through the false twist spindle 39. The spindle is rotated by frictional contact with a moving belt 65, which, in the present instance, is driven by a pulley 66 on a motor 67 (see FIG. 5). Rotation of the spindle 39 twists the yarn between the roller 38 and the tension device 35 and the action of the heater 36 and the cooling thereafter thermally sets the yarn in twisted condition. From the roller 38, the yarn Y passes through the hollow spindle 39 under the guide rollers 41 and 42 and the guide bar 43 and traverse guide 44 to the takeup spool S. The spool S is driven by a feed roller 70 mounted on a shaft 71 driven by a motor 72. The surface speed of the feed roll 70 therefore determines the linear takeup speed of the yarn Y on the spool S, a level wind on the spool S being provided by conventional operation of the traverse guide 44.

In accordance with the invention, the belt 65 and the shaft 71 are independently driven so that the rotary speed of the spindle 39 and the takeup speed of the yarn may be varied. To this end, the motors 67 and 72 are variable speed motors. In the present instance, the motors are conventional adjustable-speed slip-ring motors, the speeds of which are determined respectively by rheostats 75 and 76. The rheostats 75 and 76, in turn, are controlled by cams indicated diagrammatically at 77 and 78 respectively which have followers 79 and 80 operatively connected to the rheostats as indicated by the broken lines in FIG. 5. In addition to being variable in speed, the motor 67 is reversible. To this end, a reversing contactor 82 is connected between the power supply and the motor 67. A sequence timing switch 83 operates to control the reversing contactor 82 in a conventional manner.

The speed of motor 72 connected to the shaft 71 determines the speed of the takeup spool S and therefore the amount of twist and resultant torque inserted into the yarn at a given spindle speed. The speed of motor 67 which drives belt 65 determines the amount of twist and resultant torque inserted into the yarn at a given yarn takeup speed. The reversing contactor 82 controlled by the setting of sequence timing switch 83 determines the direction of rotation of spindle 39 and therefore direction of twisting and untwisting and the resultant direction of torque inserted into the yarn by the apparatus.

One method embodying the invention and using the apparatus of FIGS. 3-5, consists of alternately false twisting and heat setting of a predetermined sectional length of yarn in one direction and then the false twisting and heat setting of an adjacent predetermined sectional length of yarn in the opposite direction, with the takeup of the yarn being at constant speed. This method entails running the motor 67 in one direction and then in the opposite direction by the operation of the sequence timing switch 83. Sequence timing switches such as shown are commercially available and may be set to start the motor 67, keep it running for any period of time, disconnect its power source for any period of time, reverse its direction and keep it running for any period of time.

As specific example of this embodiment of the invention, 15 denier monofilament nylon yarn for the production of ladies seamless stretch hosiery on a single feed machine is produced by setting the cam 77 acting upon the rheostat 75 so that the motor 67 when energized will operate in either direction at a constant speed of 1200 r.p.m. so as to rotate the spindles at 21,600 r.p.m.; the cam 78 acting upon rheostat 76 is set so that motor 72 drives shaft 74 at a constant speed of 45 r.p.m. so as to cause a takeup of the yarn at the rate of 540 inches per minute; the temperature of the heating device is set at 450° F. before starting the machine in operation; and the sequence timing switch is regulated so as to cause the motor 67 to rotate in a clockwise direction for 3.33 seconds, then coast for 3.33 seconds, then rotate in the opposite direction for 3.33 seconds, then coast for 3.33 seconds and then back to a clockwise rotation for 3.33 seconds and so on during the entire period of operation of the machine. When set up in this manner, the apparatus produces a nylon yarn having alternating sections of opposite torque, for example, by advancing the nylon yarn continuously at a uniform rate of 540 inches per minute, false twisting (twisting and untwisting) a 60 inch section of the yarn in a clockwise direction, yarn-setting the clockwise twist in the one section of the yarn, false twisting (twisting and untwisting) another 60 inch section of the advancing yarn in the counterclockwise direction, and yarn-setting the counterclockwise twist in said other section of the yarn. Thus, the resulting yarn comprises a continuous length yarn of uniform cross section having alternating 60 inch sections having torque in opposite directions, alternate sections being clockwise, and the intermediate sections being counterclockwise.

Another method embodying the invention and using the apparatus of FIGS. 3–5, involves the alternately false twisting and yarn-setting of a predetermined sectional length of yarn in one direction while being taken up to spool S at varying linear speeds and then false twisting and yarn-setting a predetermined adjacent sectional length of yarn in the opposite direction while being taken up to spool S at varying linear speed. This embodiment entails operating the cam 78 acting upon rheostat 76 so as to automatically vary the speed of motor 72 driving the takeup shaft 71 and spool S according to a predetermined pattern and alternately running the spindle 39 in opposite directions by regulating the sequence timing switch 83 to automatically change the direction of rotation of motor 67 at the desired intervals. When operated in this manner, the apparatus produces a multi-torque yarn in which the torque varies in accordance with a predetermined pattern, by continuously advancing a yarn at varying linear speeds, false twisting (twisting and untwisting) selected sections of the advancing yarn in one direction, yarn-setting the twist in said one direction in the selected sections of the yarn, false-twisting (twisting and untwisting) other selected sections of the advancing yarn in the opposite direction, and yarn-setting the opposite twist in said other selected sections of the yarn.

The multi-torque yarns produced by the above described method wherein the takeup speed and resultant torque of the yarn varies in accordance with a predetermined pattern, has many useful applications. It is possible to obtain a tapering effect so as to gradually change from one torque to another; the torsion in a given sectional length of yarn may be leveled out by reducing the takeup speed of the yarn as the spindles slow down before reversing their direction of rotation; and it is possible to insert a different torque in one direction than in the opposite direction. A specific use of one of such yarns is in a balanced woven fabric produced from yarn processed by the invention, which prior to said processing already possessed unidirectional torque throughout its continuous length. For example, a forty denier multi-filament nylon yarn having three turns per inch of S twist and a resultant clockwise torque before processing by the invention, will have after processing by the invention, a greater clockwise torque in alternate sectional length which are false twisted S than the counterclockwise torque in the intermediate sectional lengths which are false twisted Z to the same extent. However, by the above described method of the invention, the three turns per inch of S twisted nylon is yarn-set throughout its entire continuous length, alternate sectional lengths 25 yards being false twisted 20 turns per inch S by being taken up at a given linear speed. By operating the cam 80, the speed of motor 72 is reduced 20% to cause a comparable decrease in takeup speed of the intermediate 25 yard sectional lengths of the yarn with the result that 25 turns per inch of Z twist are inserted and removed. Each intermediate 25 yard length where 25 turns per inch Z twist has been inserted and removed, has about the same counterclockwise torque as the alternate 25 yard sectional lengths where 20 turns per inch of S twist has been inserted and removed. The woven fabric in which said continuous length of yarn is used in a single shuttle to form the filling, will have a herringbone pattern and the fabric will not tend to bias or twist in either direction.

Still another method embodying the invention and using the apparatus of FIGS. 3–5, comprises false twisting and yarn-setting a predetermined sectional length of yarn in one direction at varying spindle speeds while it is advancing at varying linear speeds, and then false twisting and yarn-setting an adjacent predetermined sectional length of yarn in the opposite direction at varying spindle speeds while it is advancing at varying linear speeds. This method requires the operation of cam 78 to automatically vary the speed of the motor 72 driving the takeup shaft 71 and spool S according to a predetermined pattern and alternately running the spindles in one direction and then in the opposite direction by regulating the sequence timing switch 83 to automatically change the direction of rotation of motor 67 at desired intervals, with the spindle speed being automatically varied according to a predetermined pattern by the operation of the cam 77.

The above-described method wherein both the takeup speed or advance of the yarn and the speed of the spindles are varied and the direction of rotation of the spindle is alternately reversed (all three in accordance with desired predetermined patterns) makes possible improved yarns. The availability of apparatus to automatically vary any or all of the above three factors at the same or different intervals or degrees makes possible the production of numerous different yarns for various functional uses of appearance or utility. For example, a yarn pattern may be desired wherein there is to be alternately ten yard sections having torque in one direction and twenty yard sections having torque in the opposite direction, with the total torque in the twenty yard section being about the same as the total torque in the ten yard sections so that no bias would result in the fabric made therefrom. The method used to produce the yarn would require the minimum in power consumption by virtue of a gradual increase in spindle speed each time the direction of rotation is changed. The cam 77 is operated so that while the first ten yards of yarn is being processed the spindle speed is gradually increased from 1,000 r.p.m. to 20,000 r.p.m. The cam 72 is operateed so that while the first 10 yard length is being processed, the yarn takeup speed starts at 33 inches per minute and gradually increases in speed up to 666 inches per minute with the result that approximately 30 turns per inch of twist is inserted; the yarn is set; and the twist removed on all of the 10 yard sectional lengths of the continuous length yarn. The timing switch 83 is regulated so that at the end of each 10 yard sectional length of yarn, a reversal in direction of rotation of the spindles is effected. The cam 77 is operated to cause the spindle speed to gradually increase from 1,000 r.p.m. to 10,000 r.p.m. during the processing of the 20 yard length; the cam 72 is operated to cause the yarn takeup to start at 66 inches per minute and increase to 666 inches per minute by the end of the 20 yard length and thereby approximately 15 turns of twist per inch is inserted in the 20 yard length of yarn; the yarn is set, and the twist inserted is removed.

In addition to the methods outlined above, other methods of processing yarn may be effected using the apparatus shown in FIGS. 3 to 5 inclusive. For example, the yarn takeup may be varied without reversal of the spindle rotation to produce varying torque in the same direction; likewise, the spindle speed may be varied without reversing to produce the same yarn. The torque may also be varied by varying the spindle speed through the rheostat 75 and reversing the same by the controller 83 while maintaining the takeup speed constant. Thus, the yarn is produced by continuously advancing the yarn, twisting the advancing yarn, yarn-setting the twist, and untwisting the yarn, and producing varying torque characteristics along the continuous length of the yarn by varying at least one of the factors of the rate of advance of the yarn, the amount of twist imparted thereto during its advance, and the direction of twist imparted to the advancing yarn.

Figure 6:
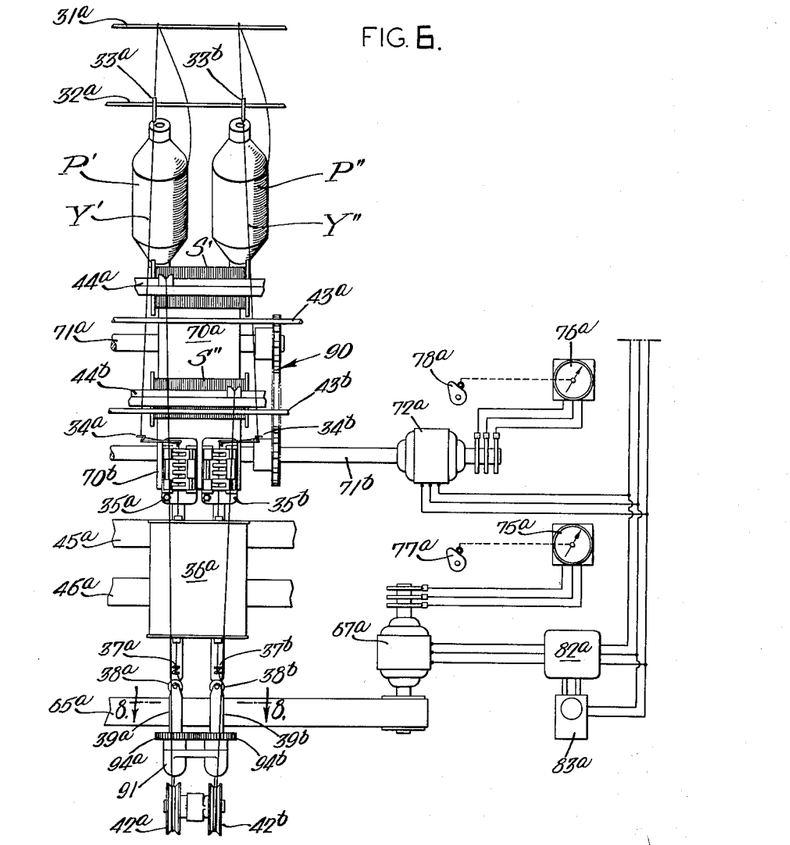
FIGS. 6 and 7 are views similar to FIGS. 5 and 4 respectively, showing a modified apparatus for performing the method of the present invention.
Figure 7:
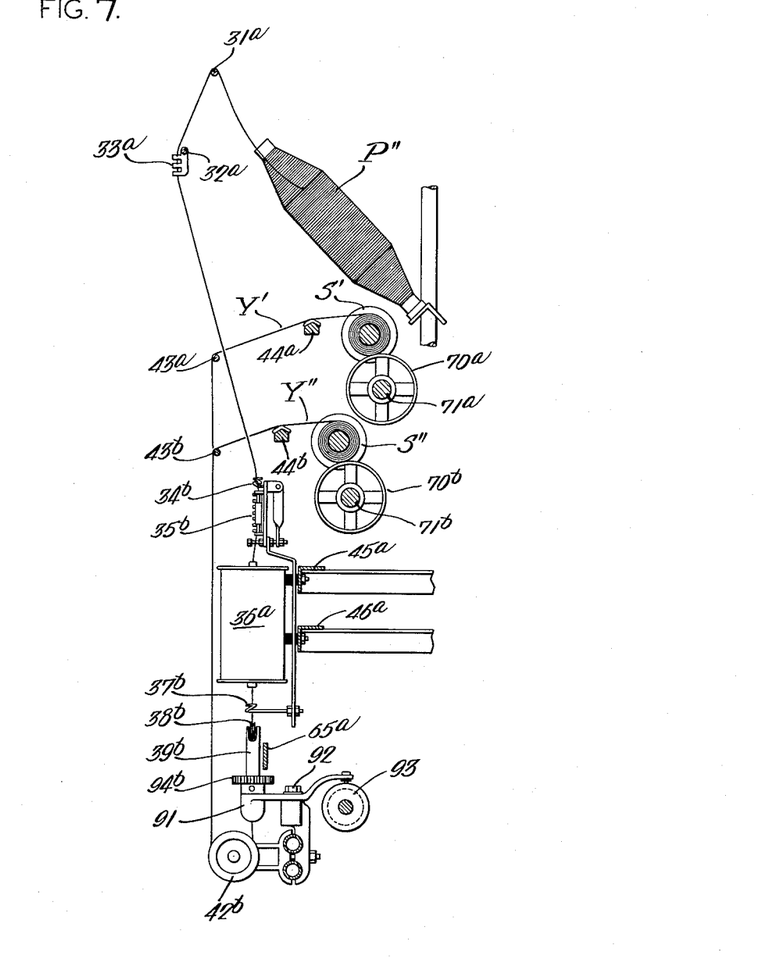
Figure 8:
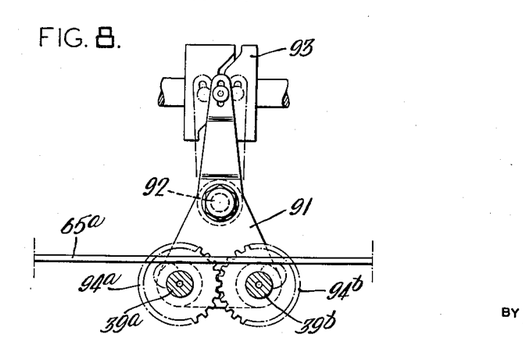
FIG. 8 is a sectional view taken on the line 8—8 of FIG. 6.

Other apparatus may be employed for carrying out the above described methods. For example, the operating elements of the apparatus shown in FIGS. 3 to 5 inclusive may be duplicated and arranged in pairs, and instead of driving each spindle individually, the spindles may be ganged together so that one is driven by a belt and the other is driven by the first spindle in the opposite direction. Such an apparatus is shown in FIGS. 6 to 8 inclusive. Referring to these figures, the yarns Y' and Y'' are supplied from the supply packages P' and P'' over the guides 31a and 32a and through snubber tensions 33a and 33b respectively, pigtails 34a and 34b respectively, tension devices 35a and 35b respectively, a dual heater element 36a having two tubes for passage of the yarns Y' and Y'', through balloon control guides 37a and 37b, around rollers 38a and 38b, through the false twist spindles 39a and 39b, around large guide rolls 42a and 42b respectively, and to the takeup spools S' and S'' respectively over guide rods 43a and 43b and traverse guides 44a and 44b. The takeup spools S' and S'' are driven by drive rollers 70a and 70b respectively, mounted on shafts 71a and 71b. In the present instance, the shafts 71a and 71b are interconnected by chains and sprockets indicated generally at 90 and are driven by a motor 72a controlled by a rheostat 76a and cam 78a similarly to the control of the motor 72. The two takeup spools S' and S'' may be used for individual takeup or for plying two or more strands of yarn.

The apparatus of FIGS. 6 to 8 inclusive affords a more economical reversal of the spindles 39a and 39b. The spindles 39a and 39b are journalled for rotation on a member 91 which in the illustrated position of FIG. 8, disengages each spindle from the drive belt 65a. The member 91 is pivoted as indicated at 92 and is controlled for pivotal movement by a barrel cam 93. When the member 91 is rocked to the clockwise limit position, the spindle 39a is engaged against the belt 65a, and when the member 91 is rocked counterclockwise, the spindle 39b is engaged against the belt. As shown, the spindles 39a and 39b are provided with gears 94a and 94b which are engaged, so that when the spindle 39a is driven by the belt in one direction, the spindle 39b is driven by the gears in the opposite direction. Conversely, when the spindle 39b is driven by the belt in the one direction, the spindle 39a is driven by the gears in the opposite direction. Thus, by operating the member 91 in accordance with a predetermined pattern, the spindles may be selectively reversed or stopped while the belt is maintained in continuous operation. In this manner, the belt 65a is driven by a motor 67a controlled as to speed by a rheostat 75a having a cam operator 77a. If desired, a reversing contactor 82a having a sequence timing switch 83a may be applied to the motor 67a. However, when reversing the spindles, it is not necessary to stop and reverse the motor 67a, since it is more economical to rock the member 91 to engage the opposite spindle against the belt 65a. Of course, instead of the pivotally mounted geared spindles, other interconnected counter-rotating dual false twist spindles may be used in which no more than one spindle at a time is in driving engagement with a driver belt, and the other spindle of the pair is driven by the belt-driven spindle in the opposite direction.

In FIGS. 6 to 8, as in FIGS. 3 to 5, the supply creel is mounted above the uptwister, the heating devices 36a are energized and maintained at uniform temperature in the same manner; the spindle belt 65a is driven in the desired predetermined direction or directions at the desired predetermined speed or speeds for the desired predetermined intervals; the takeup shaft 71a is driven at the desired predetermined speed or speeds for the desired predetermined intervals; and the tension is properly adjusted. The cam 93 may be set so as to cause spindles 39a and 39b to alternately contact spindle belt 65a according to a predetermined pattern. If desired, the interconnected driving means between the spindles 39a and 39b may be removed or disengaged and both of the dual spindles may be in constant contact with the belt, with the dual torque in the yarn being produced by using the reversing starter 82 as explained in reference to FIG. 5.

With the apparatus of FIGS. 6 to 8, unlike the apparatus of FIGS. 3–5, the shortness of the sectional lengths of the yarn having torque in one direction and then in the other direction is not the prime factor limiting the production per spindle. Relatively high horsepower motors are required to drive the spindles of multi-spindle up twisters, even when the spindles are of the false twist type, and it has been found to be impractical to continuously reverse the direction of rotation of such motors at intervals of less than six seconds. As a consequence, with the apparatus of FIGS. 3–5, many desirable yarns having short sectional lengths with torque in one direction and then alternately short sectional lengths with torque in the opposite direction, cannot be produced economically at normal spindle speeds because of the length of yarn twisted during a six second interval. Such is not the case with the apparatus of FIGS. 6 to 8.

The apparatus of FIGS. 6 and 7 is especially suitable for producing dual torque yarn for single carrier full fashioned hosiery. In the ankle of a full fashioned ladies stocking, the length of yarn comprising one course is quite short in comparison with the length of yarn comprising one course in the ankle of a ladies seamless stocking. Since it has generally been found that if more than two courses of loops are biased in one direction an undesirable "zebra" appearance results in the stocking, it is necessary that the sectional length of dual torque yarn be not longer than that required to knit two courses or about forty inches. With the spindles rotating at 21,600 r.p.m. and inserting and removing 20 turns per inch of twist, forty inches of yarn is processed every 2.22 seconds and by the use of the apparatus of FIGS. 6 and 7, spindle 39a and then spindle 39b is alternately engaged with the belt every 2.22 seconds which is entirely practical and very economical. In fact, it is entirely practical and economical to produce a continuous length yarn having alternately twenty inches, or even ten inches with torque in one direction and then the same or different length with torque in the opposite direction.

Figure 9:
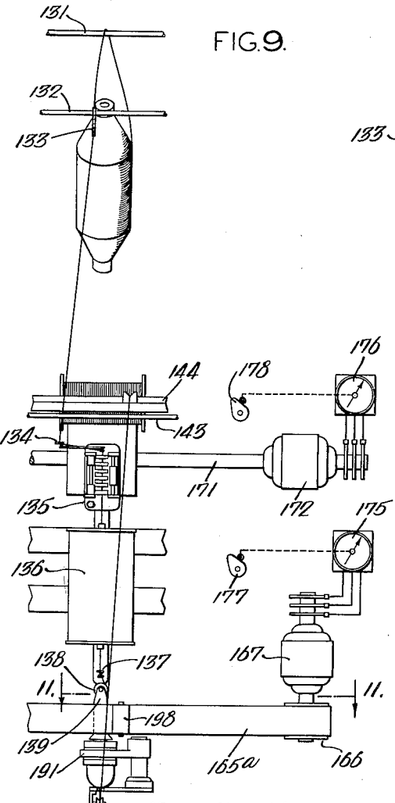
FIGS. 9 and 10 are views similar to FIGS. 5 and 4 of another apparatus for carrying out the methods of the present invention.
Figure 10:
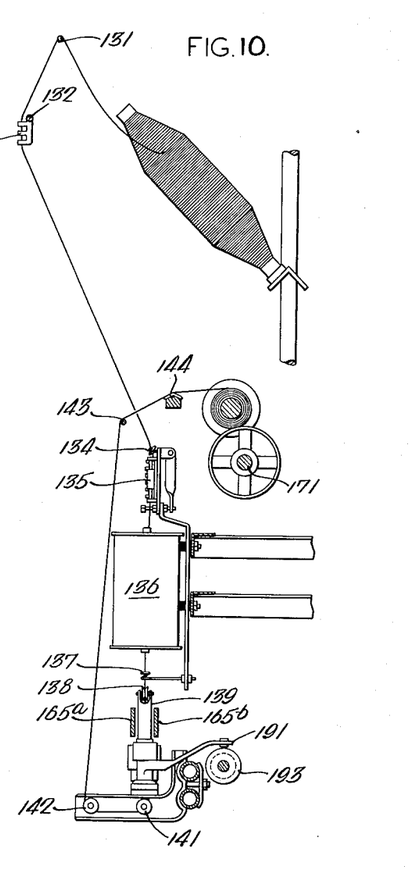
Figure 11:
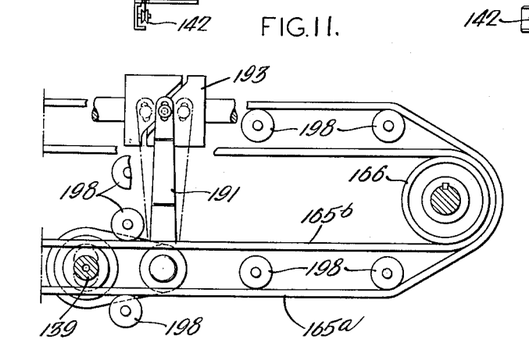
FIG. 11 is a sectional view taken on the line 11—11 of FIG. 9.

FIGS. 9–11 represent another false twist apparatus for producing yarn in accordance with the invention. The modified apparatus is mounted as attachments to conventional up-twisters. The essential differences between the apparatus of FIGS. 9–11 and the apparatus of FIGS. 3–5, are the utilization of two spindle belts 165a and 165b, between which false twist spindles 139 are positioned and caused to be alternately driven in one direction and then the other according to a predetermined pattern by the operation of a cam 193 which in turn acts upon a spindle swing actuating lever 191 causing the spindle 139 to first contact one belt and then the other. The apparatus of FIGS. 9 to 11 has the advantages of FIGS. 6 to 8 in respect to the elimination of the requirement of reversing the direction of rotation of the motor driving the spindle belt in order to reverse the direction of rotation of the spindle. It will be noted in FIG. 11 that belts 165a and 165b are both driven in the same direction by drive pulley 166 and that idlers 198 are so positioned as to maintain the belts in spaced parallel relationship. With the exceptions mentioned above, the threading and operation of the apparatus is as explained herein with reference to FIGS. 3–5, and reference characters 131 to 178 have been applied to the elements corresponding to the elements identified in FIGS. 3–5 by the characters 31—78. In carrying out the method on the apparatus of FIGS. 9 to 11, the yarn is continuously advanced; the advancing yarn is twisted; the twist in said advancing yarn is yarn-set; the advancing twisted and set yarn is untwisted; and a yarn having a varying torque along its length is produced by varying at least one of the factors of the rate of advance of the yarn, the amount of twist imparted thereto, and the direction of twist imparted thereto; whereby the twist imparted and removed from one section of the yarn differs from the twist imparted and removed from another section of the yarn to provide differing torque characteristics along its length.

Figure 12:
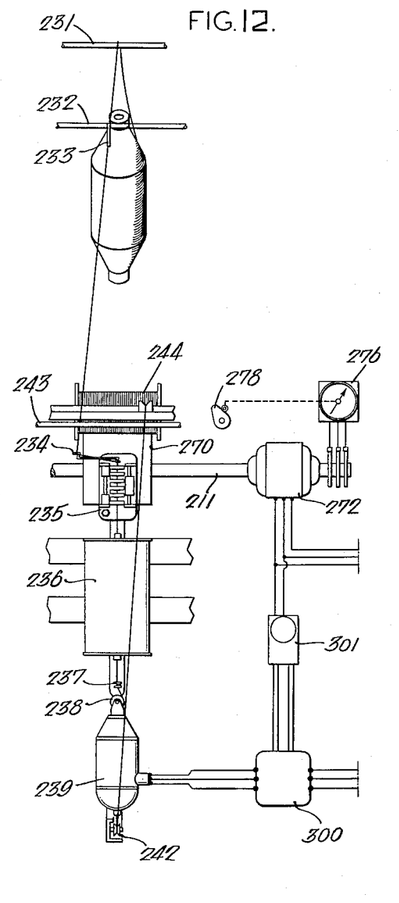
FIGS. 12 and 13 are views similar to FIGS. 5 and 4 of another apparatus for carrying out the method of the present invention.
Figure 13:
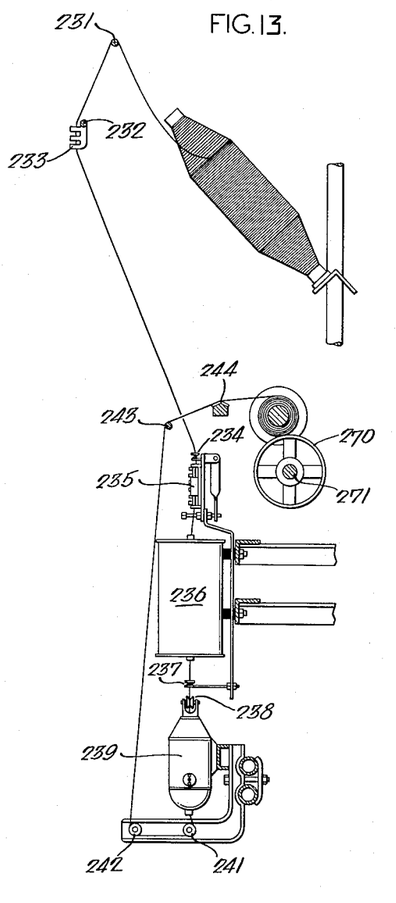

Another false twist apparatus for carrying out the method of the invention is illustrated in FIGS 12 and 13. As in the other modifications of the invention herein disclosed, the apparatus of FIGS. 12 and 13 comprises attachments to conventional up-twisters. The essential difference between the apparatus of FIGS. 11 and 12 and the apparatus of FIGS. 3–5 is the use of individually motorized hollow false twist spindles 239 which are driven from a high frequency power source and connected through a reversing contactor 300 to control the direction and speed of rotation and the frequency of reversals by means of sequence timer 301. With the exceptions mentioned above, the threading and operation of the apparatus is as explained herein with reference to FIGS. 3–5 and reference characters 231 to 278 have been applied to the elements corresponding to the elements identified in FIGS. 3–5 by the characters 31—78. The apparatus makes possible the false twisting and heat setting of the yarn in the same or different degrees, and/or directions while being advanced at different or the same linear speeds to thereby produce a yarn having in different sections of its length, different torque characteristics.

In each apparatus described above, the twist is inserted into the yarn at a single station, by false twist means which may be rotated either clockwise or counterclockwise, depending on the setting of the controls for the drive to said false twist spindle. It is within the scope of the invention, however, to direct the yarns through two false twist stations, the first station false-twisting the yarn in one direction, and the second station false-twisting the yarn in the opposite direction. The twist in the yarn is yarn-set at only one of the two stations when it is desired to impart torque to the yarn, and at neither of the stations when it is desired to provide an absence of torque in the yarn.

Figure 14:
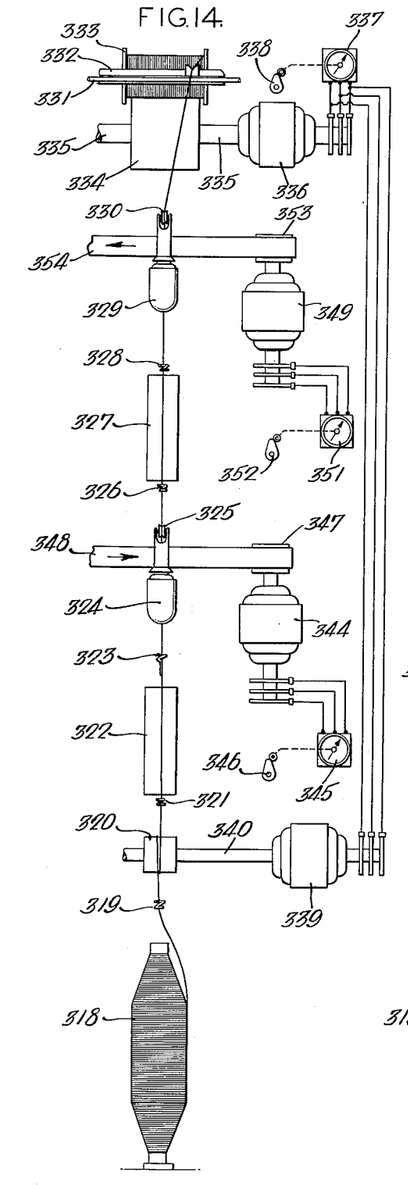
FIGS. 14 and 15 are views similar to FIGS. 5 and 4 of still another apparatus for performing the method of the present invention.
Figure 15:
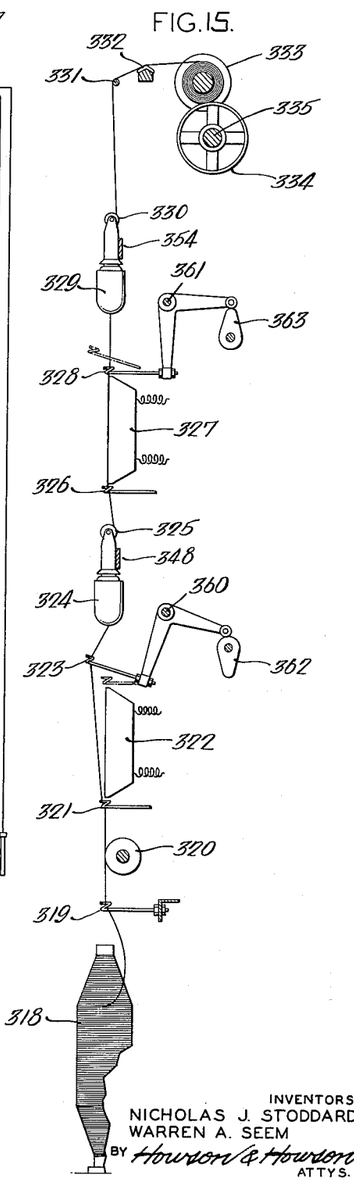

A suitable apparatus for effecting this modification of the method of producing torque yarns is illustrated diagrammatically in FIGS. 14 and 15. As in other apparatus disclosed, the apparatus of FIGS. 14 and 15 comprises attachments to conventional up-twisters. A supply package 318 mounted on a creel above the floor and the yarn to be processed then travels through a centering eye 319, around a furnishing roll 320 whose speed is synchronized with the speed of take-up roll 334 to provide proper tension on the yarn, then through centering eye 321, past the face of electrical contact heater 322 having a temperature adequate to set the yarn being processed, then through guide eye 323, then through false twist spindle 324 rotating in a clockwise direction to insert S twist in the yarn between the roller 325 of the spindle 324 and the furnishing roll 320, through centering eye 326, then past the face of a second heater 327, through a second guide eye 328, through a second false twist spindle 329 rotating in a counterclockwise direction to insert Z twist in the yarn between the roller 330 of the spindle 329 and the roller 325 and finally the yarn is taken up by a spool 333 over a guide bar 331 and traverse guide 332. The take-up spool 333 is driven by a take-up roll 334 mounted on a shaft 335 driven by a variable speed motor 336, the speed of which is controlled by a rheostat 37 which is operated by a cam 338. In order to synchronize the speed of the furnishing roll 320 with the speed of the take-up roll 334, the rheostat 337 also controls the speed of a variable speed motor 339 driving the furnishing roll 320 through a shaft 340. The false twist spindles 324 and 329 are also driven at variable speeds by variable speed motors 344 and 349 respectively. The motors 344 and 349 are controlled as to speed by rheostats 345 and 351 operated by cams 346 and 352 respectively. The variable speed motors 344 and 349 drive the spindles by means of pulley 347 and 353 and belts 348 and 354, as indicated by the arrows in FIG. 14. The heaters 322 and 327 are energized from a source (not shown) which, if desired, may be regulated compensatively with changes in ambient temperature and transfer of heat to the yarn traveling thereacross in a manner similar to the regulation of the heaters 36 described above.

In order to provide sections in the yarn which have opposite torques or no torque, means is provided to disengage the yarn selectively from the faces of the heaters 322 and 327. To this end, the guide eyes 323 and 328 are transversely pivoted as indicated at 360 and 361 respectively and are selectively moved between the full line and broken line positions shown in FIG. 15 by cams 362 and 363 respectively. In the operation of the apparatus, the cams 362 and 363 are preferably operated so that no more than one of the guide eyes 323 and 328 positions the yarn in contact with the contact heater 322 or 327 respectively. When the yarn is engaged with the heater 322 and disengaged from the heater 327, the clockwise twist inserted by the spindle 324 is yarn-set in the yarn to provide clockwise torque when the yarn is untwisted. In a similar manner, when the yarn is disengaged from the heater 322 and engaged with the heater 327, counterclockwise twist inserted by the spindle 329 is yarn-set in the yarn to provide counterclockwise torque when the yarn passes the spindle roller 330. When both of the guide eyes 323 and 328 disengage the yarn from the respective heaters, the twist inserted by the spindles 324 and 329 is not set in the yarn, and no substantial torque is imparted to the yarn by the apparatus. To provide varying degrees of torque, the cams 338, 346, and 352 are operated to vary the advance or amount of twist of the yarn in accordance with a desired pattern. By using the apparatus of FIGS. 14 and 15, the motors, belts, or spindles need not be reversed to produce opposite torque forces in selected sections of a continuous length yarn, and accordingly, rapid changes and extremely short sections of length of opposed torque in the yarn is possible, and greater uniformity of torque within each section is obtained.

The latter apparatus therefore enables the production of a yarn having alternating sections of opposite torque by performing the steps of advancing the nylon yarn continuously, twisting the advancing yarn in one direction, untwisting the same, twisting the advancing yarn in the opposite direction, untwisting the same, yarn-setting in selected sections of the advancing yarn twist inserted in one direction, and yarn-setting in other selected sections of the yarn twist inserted in the opposite direction. In addition, varying degrees of torque may be produced in the above method by varying at least one of the factors of the rate of advance of the yarn and the amount of twist inserted therein.

In the foregoing description, various forms of apparatus have been described for producing multiple torque yarns by the steps of false-twisting the yarn in one direction, and yarn-setting the twist inserted by said false twisting step, and varying at least one of the factors of the rate of advance of the yarns, the amount of twist inserted by said false twisting step, and the direction of twist. Of course, other methods and apparatus may be employed for producing similar yarns.

Hollow double-twist spindles may also be used to produce multi-torque and multi-twist yarns. The term "double-twist spindles" is intended to mean hollow spindles (common in the art) which insert two turns of twist for every revolution of the spindle without revolving the delivery package. When such spindles are used, it is generally desired to produce multi-twist yarns, irrespective of torque, if any. By using a double twist spindle, it is possible to produce yarn having in different predetermined sections of its continuous length, S twist of a given magnitude, S twist of a different magnitude, no twist, Z twist of said given magnitude, and Z twist of a different magnitude, as well as yarn having in its continuous length any combination of two or more of these variable sectional lengths.

Figure 16:
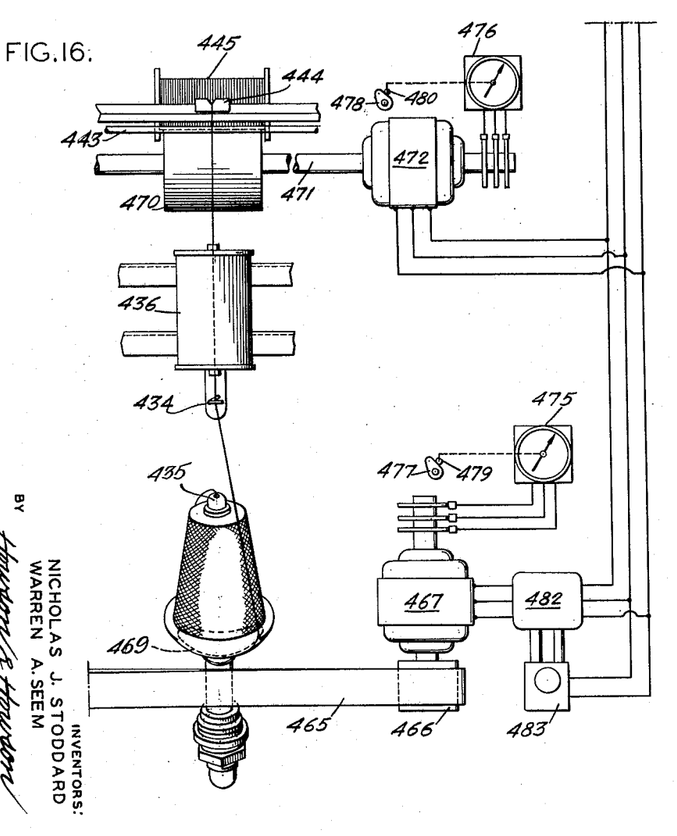
FIGS. 16 and 17 are views similar to FIGS. 5 and 4 of yet another apparatus for inserting varying torques or twists in yarns; and, FIGS. 18 and 19 are views similar to FIGS. 5 and 4 of a further apparatus for inserting varying torques or twists in yarns.
Figure 17:
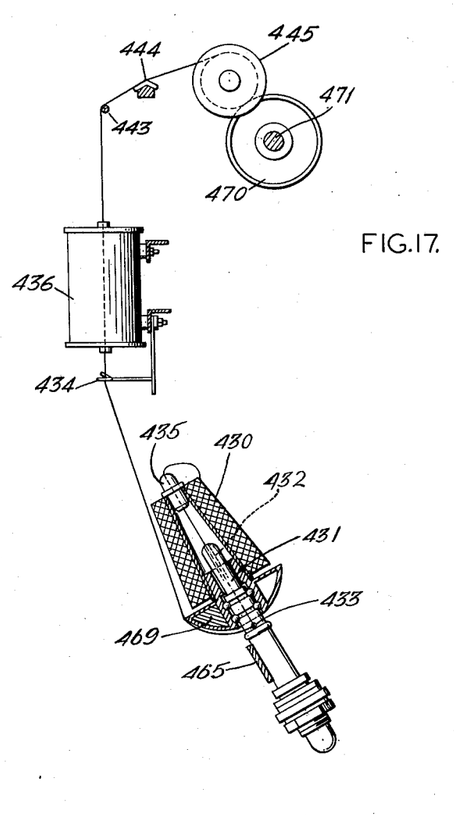

FIGS. 16 and 17 show an apparatus employing double twist spindles. In this apparatus, a yarn supply 430 having at the upper end thereof a conventional tension device 435 is rotatably mounted on a hollow double twist spindle 431 having an open upper end at 432 for receiving the yarn from the tension device and a discharge aperture 433 for passing the tensioned yarn therefrom. The yarn is then guided by pigtail 434 through a heater 436, over guide bar 443 and transverse guide 444 onto a take-up spool 445. The heating device 436 and tension device 435 may be regulated similarly to the devices 36 and 35, as described above.

In the operation of the device, the spindle 431 is rotated by frictional contact with a moving belt 465 which, in the present instance, is driven by a pulley 466 on a motor 467. Means is provided to prevent rotation of the supply package 430. In the present instance the means comprises a weight 469 in one side of the base of the package 430, although other means, such as magnets, may be used which afford free passage of the yarn about the package. For each turn of the spindle, one turn of twist is inserted between the tension device 435 and the aperture 433, and an additional turn of twist is inserted between the aperture 433 and the spool 445. Thus, each turn of the spindle inserts two turns of twist in the yarn. The speed and direction of rotation of the spindle 431 therefore controls the amount and direction of twist in the yarn. The take-up spool 445 is driven by a feed roller 470 mounted on a shaft 471 driven by a motor 472. The speed of rotation of the motor 472 determines the take-up speed of the yarn.

The motors 467 and 472 are variable speed motors and the amount and direction of twist is controlled by controlling the speeds of the two motors and the direction of the motor 467. In the present instance, the controls are similar to the controls indicated at 75 to 83 and are indicated by the reference characters 475 to 783.

Although FIGS. 1 and 2 of the drawings have been described as illustrating the degree and direction of torque, they may also illustrate the degree and direction of twist in multi-twist yarns. In any of the apparatus of FIGS. 6 to 13, inclusive, double twist spindles and supplies may replace the false twist spindles and separate supplies shown in the same way the spindle 431 and supply 430 replaces the spindle 39 and supply P of FIGS. 3 to 5. The resultant double twist apparatus can then be employed to carry out the methods mentioned with respect to false twisting. The only essential difference is that the yarns produced by the false twist apparatus have varying degrees and directions of torque, whereas yarns produced by double twist apparatus are characterized by correspondingly varying degrees and directions of twist. By deenergizing the heater and relaxing the tension device during the twisting operations, the twisted yarn exhibits maximum torque in the directions opposite to the twists present in the yarn, whereas by controlling the heater and/or the tension device to yarn-set the yarn, the yarn exhibits minimum torque. Intermediate torque is obtained by controlling the heater and/or the tension device to partially yarn-set the yarn.

Conventional twisting spindles may also be used to produce multi-torque or multi-twist yarns. When such methods are used, multi-twist yarns are generally the desired result, irrespective of the degree of torsion, if any, in the yarn. By using conventional spindles, it is also possible to produce yarns having in various predetermined sections of their continuous length, Z twist of a given magnitude, Z twist of a different magnitude, no twist, S twist of said given magnitude, and S twist of a different magnitude, as well as yarns having in their continuous length any combination of two or more of these variable sectional lengths.

When, in the apparatus of FIGS. 3 to 13, inclusive, conventional twisting spindles replace the false twist and separate supplies shown, the resultant conventional spindle apparatus can be employed to carry out the methods mentioned with respect to false twisting. The only essential difference is that the yarns produced by the false twist apparatus have varying degrees and directions of torque, whereas yarns produced by the conventional spindle apparatus and methods are characterized by correspondingly varying degrees and directions of twist.

Figure 18:
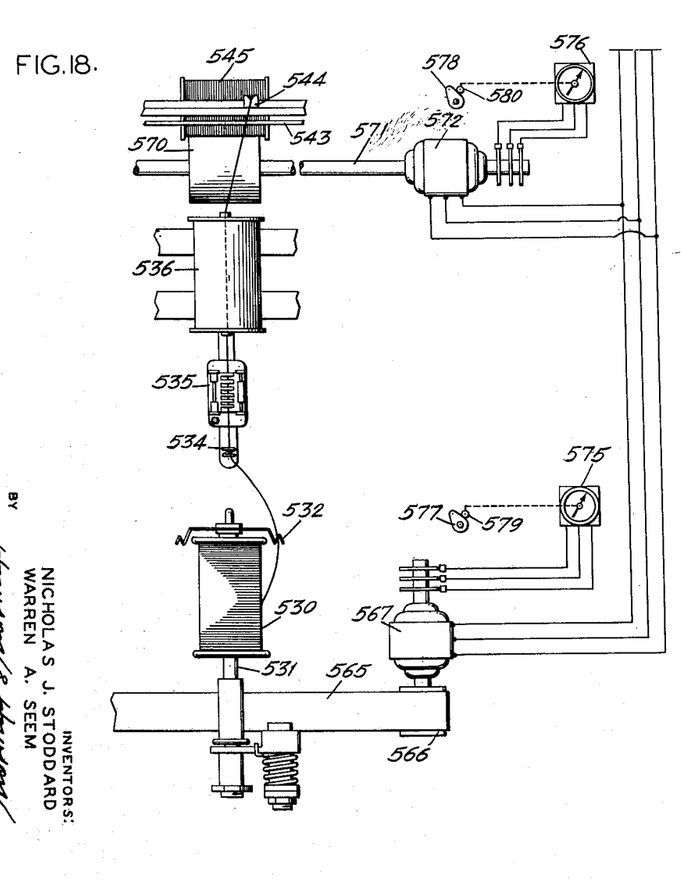
Figure 19:
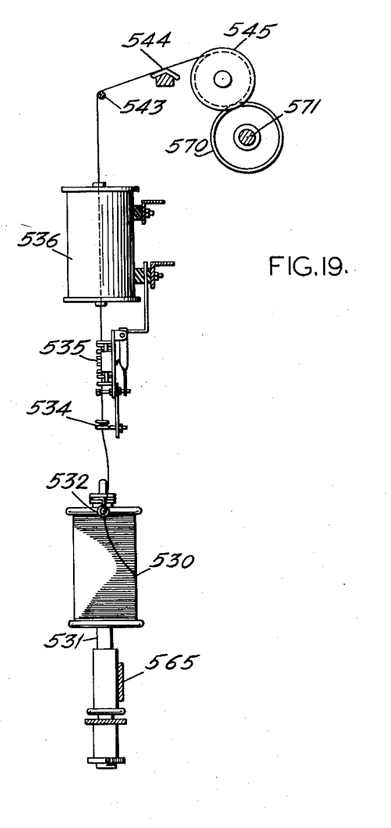

For example, as shown in FIGS. 18 and 19, supplies may replace the false twist spindles and separate supplies of FIGS. 3–5. In this apparatus, the yarn is drawn from a supply 530 mounted on a spindle 531 having a conventional flier 532 thereon. The yarn passes through a pigtail 534, a tension device 535, and a heater 536, over a guide bar 543 and traverse guide 544 to the take-up spool 545. The heater 536 and tension device 535 may be regulated in the same manner as the heater 36 and tension device 35.

In the operation of this apparatus, the spindle 531 is rotated by a belt 565 driven by a pulley 566 on a variable speed motor 567. Likewise, the take-up spool 545 is rotated by a roller 570 on a shaft 571 driven by a variable speed motor 572. The motors 567 and 572 are governed by speed controls 575 to 580 similar to the controls 75 to 79 to impart varying degrees of twist to the yarn. The reversing controls for the motor 567 are omitted since a conventional spindle cannot be reversed during the twisting operation.

The apparatus of FIGS. 12 and 13 may also be modified in like manner by replacing the false twist spindle and separate supply by a conventional spindle and supply to produce the same results. As noted above, the heater and tension device may be regulated to produce various degrees of torque.

Also by various methods of utilizing conventional twisting spindles yarns of various degrees and directions of torque and twist may be produced. For example, one method of producing, with conventional spindles, a continuous length monofilament nylon yarn having alternate sectional lengths with 30 turns of twist per inch in opposite directions is to first twist the yarn 30 turns per inch Z throughout its entire length, then in a separate twisting operation, twist sectional lengths 60 turns per inch S and do not twist the alternate adjacent sectional lengths. This may be carried out by engaging and disengaging (and braking) the spindles with the spindle belt or by starting and stopping the motor driving the spindle belt while keeping the take-up of the yarn at a constant speed by a motor independently driving the take-up rolls. In addition, this may be carried out by driving the take-up spool alternately fast and slow, the fast speed effecting minimum S twisting and the slow speed effecting maximum S twisting. For example, at a spindle speed of 12,000 r.p.m., the take-up spool drive shaft rotates at 16.66 r.p.m. to take up the yarn at 200 inches per minute and impart 60 t.p.i. S twist, and at 1000 r.p.m. to take up the yarn at 12,000 inches per minute to insert only 1 t.p.i. S twist.

The yarn may also be first twisted with alternate sections of 60 turns Z and zero twist, and then reverse twisted 30 turns S throughout its length to provide alternate S and Z twisted sections of 30 turns per inch.

The yarn may be partially or completely yarn-set only after the initial Z twisting operation or only after the S twisting operation, or the yarn may be twisted without any yarn setting, depending upon the degree and direction of twist liveliness or torque desired.

Many variations of a method to produce multi-torque or multi-twist yarns involving the pretwisting of a yarn and the subsequent reverse twisting sectional lengths are possible and include the setting or partial setting during or after the initial twisting of the entire length of pretwisted yarn or sectional lengths thereof, the yarn-setting or partial yarn-setting during or after reverse twisting of the entire length or sectional lengths of the yarn, the running and stopping of the spindles, the running of the spindles at high and low speed and the varying of the take-up speed of the yarn being twisted or reverse twisted.

Also methods may be used which involve a combination of false twisting and double twisting or conventional twisting. These methods produce yarns having in selected predetermined sections of their continuous length varying twist and/or torque in one direction, an absence of twist and torque, and varying twist and/or torque in the opposite direction, as well as yarns having in their continuous length any combination of two or more of these variable sectional lengths.

The various examples were described above in connection with a 15 denier nylon monofilament, but other monofilaments and multifilament yarns which are inherently thermoplastic, wet out with thermoplastic material, or capable of being cold drawn and having various deniers from 7 to 200 may be twisted and/or false twisted from 0 to 65 turns per inch may be produced in the methods of the present invention.

While a particular apparatus and methods have been herein illustrated and described, it is not intended to limit the invention to the particular disclosure, but changes and modifications may be made therein and thereto within the scope of the following claims.

What is claimed is:

1. The method of producing textile yarn of uniform cross section having in selected sections of its continuous length different torques which comprises continuously advancing the yarn, false twisting the yarn, setting the yarn while it is twisted, and selectively varying the direction of false twisting.

2. The method of producing textile yarn of uniform cross section having in selected sections of its contiuous length different torques which comprises continuously advancing the yarn, false twisting the yarn, setting the yarn while it is twisted, and selectively varying the amount of false twisting.

3. The method of producing textile yarn of uniform cross section having in selected sections of its continuous length different torques which comprises continuously advancing the yarn, false twisting the yarn, setting the yarn while it is twisted, and selectively varying the rate of advance of said yarn to vary the degree of twist set in the yarn.

4. The method of producing textile yarns having in selected sections of their continuous lengths opposite torques which comprises continuously advancing two yarns simultaneously, false twisting one of said yarns in one direction and the other of said yarns in the opposite direction, setting the yarns while they are twisted, and at selected intervals simultaneously reversing the direction of false twisting of said two yarns.

5. A method according to claim 4 including the step of varying the rate of advance of the yarns.

6. The method according to claim 4 including the step of varying the amount of twist imparted to said yarns by said false twisting.

7. The method of producing textile yarns having in selected sections of its length opposite torques which comprises continuously advancing the yarn, false twisting the yarn in one direction at one station, false twisting the yarn in the opposite direction at another station, and setting in selected sections of the yarn the twist inserted at only one of said two stations.

8. The method according to claim 7 including the step of varying at least one of the factors of the rate of advance of the yarn, and the amount of twist imparted thereto at said stations during its advance.

9. The method of producing textile yarns having in alternating sections of its length opposite torques comprising the steps of continuously advancing the yarn, twisting the yarn in one direction at one station, setting in only alternate sections of the yarn the twist inserted at said station, twisting the yarn in the opposite direction a another station and setting in only the intermediate sections of the yarn the twist inserted at said other station.

10. In the method of selectively false twisting yarn in opposite directions and setting the twists therein, the steps of advancing the yarn through a false twist spindle, and selectively rotating said spindle in opposite directions.

11. In the method of selectively false twisting yarn in opposite directions and setting the twists therein, the steps of advancing the yarn through a false twist spindle, frictionally rotating said spindle by engaging the same with belt means, and selectively reversing the direction of travel of said belt means engaging said spindle.

12. The method of continuously producing a textile yarn having alternating sections of opposite torques comprising advancing a textile yarn, twisting the advancing yarn in one direction, setting the twist in one section of the yarn, removing the twist inserted in the one direction, twisting the advancing yarn in the opposite direction, setting the opposite twist in another section of the yarn, and removing the twist inserted in the opposite direction.

13. The method of continuously producing a textile yarn of uniform cross section having selected sections of different torques comprising advancing a textile yarn of uniform cross section, twisting the advancing yarn, setting the twist in one section of the yarn, removing the twist inserted to provide a torque in said section, twisting the advancing yarn differently, setting the different twist in another section of the yarn, and removing said different twist to provide a different torque in said other section.

14. The method of continuously producing a nylon yarn of uniform cross section having alternating sections of opposite torques, the torque in said sections varying in degree comprising advancing a textile yarn, twisting the advancing yarn in one direction, setting the twist in one section of the yarn, removing the twist inserted in the one direction, twisting the advancing yarn in the opposite direction, setting the opposite twist in another section of the yarn, removing the twist inserted in the opposite direction, and varying at least one of the factors of the rate of advance of the yarn and the degree of twisting the yarn during one of said twisting steps.

15. The method of producing torque yarn having twist torques in alternating sections thereof which comprises continuously advancing an end of yarn from a source past a heating element and through a rotating twisting spindle while moving said end of yarn into and out of setting relation with said heating element in alternation for prescribed intervals.

16. The method of producing torque yarn having reverse twist torques in alternating sections thereof which comprises continuously advancing an end of yarn from a yarn package past a heating element and through a rotating twisting spindle by which the said end of yarn is continuously twisted in one direction as it is being advanced from said package, intermittently moving said end of yarn into and out of heating engagement with said heating element as said end of yarn is being advanced and twisted to thereby heat set the twists in alternate sections of said end of yarn, then untwisting the yarn, and then twisting the said end of yarn thus twisted and heat set in the opposite direction to impart reverse twists to the alternate unset sections thereof, and applying sufficient heat to said end of yarn to heat set the reverse twists in the previously unset sections thereof.

References Cited in the file of this patent

UNITED STATES PATENTS

| | | |
|---|---|---|
| 2,089,193 | Dreyfus | Aug. 10, 1937 |
| 2,155,519 | Whitehead | Apr. 25, 1939 |
| 2,702,982 | Guyot | Mar. 1, 1955 |
| 2,751,747 | Burleson | June 26, 1956 |
| 2,761,272 | Vandamme et al. | Sept. 4, 1956 |
| 2,837,889 | Comer | June 10, 1958 |
| 2,876,616 | Austin et al. | Mar. 10, 1959 |
| 2,909,028 | Comer et al. | Oct. 20, 1959 |

FOREIGN PATENTS

| | | |
|---|---|---|
| 355,447 | Great Britain | Aug. 27, 1931 |